Aug. 25, 1959 R. CHAPMAN ET AL 2,901,556

SEMI-CONDUCTOR AMPLIFIERS

Filed Jan. 5, 1955 2 Sheets-Sheet 1

Inventors
R. CHAPMAN
L. E. ROBINSON
By Philip M. Bolton
Attorney

Inventors
R. CHAPMAN
L. E. ROBINSON
By Philip M. Bolton
Attorney

United States Patent Office 2,901,556

Patented Aug. 25, 1959

2,901,556

SEMI-CONDUCTOR AMPLIFIERS

Roger Chapman and Laurence Elsworth Robinson, Sidcup, England, assignors to International Standard Electric Corporation, New York, N.Y.

Application January 5, 1955, Serial No. 480,006

Claims priority, application Great Britain February 10, 1954

3 Claims. (Cl. 179—171)

Figure 1:
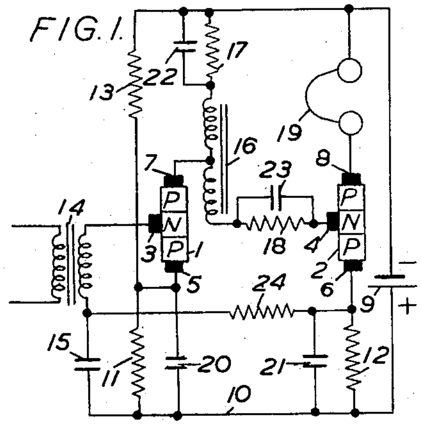

The present invention relates to electric amplifiers employing semiconductor devices known as crystal triodes or transistors, and is concerned principally, but not exclusively, with amplifiers intended for hearing aids.

The most expensive item in the maintenance of hearing aid devices is the battery required for operating the amplifier, and this is a serious limitation to devices employing valves. At first sight, it would appear that an immediate and useful economy in battery power ought to result from the replacement of valves by crystal triodes, but there are two reasons why direct replacement is impracticable. First, the characteristics of crystal triodes vary quite seriously with variations in temperature, and secondly, at any rate at the present time, the characteristics of different samples of the same type of crystal triode are very appreciably different.

While stabilising circuits for crystal triodes have already been proposed, it has been found that they are unsuitable for hearing aids because the stabilising arrangements consume considerably more power than the crystal triode, and so no advantage is gained as regards economy in battery power.

The principal object of the present invention, therefore, is to provide stabilising arrangements for a crystal triode amplifier, the application of which does not increase the power consumption by more than a small amount, so that an appreciable economy in battery power is obtained by using crystal triodes instead of valves in the amplifier.

This object is achieved by providing a multi-stage crystal triode amplifier for amplifying an electric signal occupying a given alternating current fraquency band, in which successive stages of the amplifier are coupled by networks having a direct current path, and in which a direct current negative feedback path is provided between a crystal triode in a later stage and a crystal triode in an earlier stage for stabilising the collector current of the crystal triode in the said later stage.

The invention also provides a multi-stage crystal triode alternating current amplifier comprising means for effectively connecting the emitter electrodes of all the crystal triodes to a point of substantially fixed potential as regards alternating current, means for coupling the collector electrode of each crystal triode except the last to the base electrode of the following crystal triode in such manner as to maintain a direct current path between the said electrodes, and a direct current negative feedback connection between the last stage of the amplifier and an earlier stage, the said connection being so arranged as substantially to stabilise the collector current of the crystal triode in the said last stage.

The invention also provides a hearing aid device employing a multi-stage crystal triode amplifier specified in either of the two preceding paragraphs.

The invention will be described with reference to the accompanying drawings, in which Figs. 1 to 7 show schematic circuit diagrams of crystal triode amplifiers according to the invention.

Crystal triodes can be broadly divided into two classes, namely those depending for their action on the use of two catswhiskers making contact close together on the surface of a semiconducting crystal, of the kind described, for example, in British patent specification No. 694,021; and those in which the action depends on the existence of junctions between portions of the semiconductor having P- and N-type properties, of the kind described, for example, in the specification of British application No. 15,512/49. The catswhisker type really operates in basically the same way as the junction type, since after the electroforming process to which they are submitted during manufacture, there are in effect systems of P–N junctions on the surface of the semiconductor beneath the catswhiskers. Both these classes include two types of crystal triode, according to whether the base electrode is in contact with a P-type region or an N-type region, and the collector electrode has to be biassed with respect to the emitter electrode positively for one type and negatively for the other.

Although the circuits described to illustrate the invention employ junction type crystal triodes of the kind in which the base electrode is in contact with an N-type region of the semiconductor, it will be understood that the other kind can be used, and if so, the only alteration to the circuit necessary is to reverse the polarity of the operating source. However, in some circuits described below both kinds of crystal triode are used together. In every case, a junction type crystal triode could, if desired, be replaced by one employing catswhiskers.

When an amplifier is employed for a hearing aid device, it is necessary that the output power level should be maintained substantially constant. As has already been explained, the gain and output power of a crystal triode vary considerably from one sample to another, and also with change of temperature. It has been found that the output power level is closely related to the value of the collector current of the crystal triode in the last stage of the amplifier, and accordingly, in order to stabilise the output power level it is sufficient to stabilise the collector current of the last stage. This is done according to the invention by providing direct current negative feedback between the last stage of the amplifier and an earlier stage. When the output level of the amplifier is stabilised in this manner, the gain at signal frequencies will not be affected by the negative feedback. However, as will be explained later, the gain of the amplifier for the signals to be amplified may be stabilised by suitable application of further negative feedback which operates over the band of frequencies occupied by the signals, in which case the gain will, of course, be reduced by the further negative feedback.

Fig. 1 shows a two stage amplifier provided with direct current stabilisation according to the invention. It comprises two crystal triodes 1, 2 of the junction type. Each consists of a semiconducting crystal (for example, germanium) having a region of N-type conductivity sandwiched between two regions of P-type conductivity. The base electrodes 3, 4 are in contact with the N-type regions, and the emitter electrodes 5, 6 are in contact with the lower P-type regions. The collector electrodes 7, 8 are in contact with the upper P-type regions.

A direct current source 9 (which may, for example, have a potential of 1½ volts) has its positive terminal connected to a conductor 10, which will be considered for convenience as a conductor of fixed potential, and it could be connected to ground if desired, though this is not essential. All potentials will be referred to that of conductor 10. The emitter electrodes 5 and 6 are respectively connected to conductor 10 through resistors 11 and 12 and the emitter electrode 5 is also connected to the negative terminal of the source 9 through a resistor 13. By operating the crystal triodes with the emitter electrodes at fixed potential for signal frequencies, maximum power gain will be obtained.

Signals to be amplified are supplied through an input transformer 14, the secondary winding of which has one terminal connected to the base electrode 3, and the other to the fixed potential conductor 10 through a relatively large capacitor 15, which should have negligible impedance at the frequencies contained in the signal.

Since the output impedance of a crystal triode is generally very much larger than the input impedance, the two stages should be coupled by a step-down transformation which is provided by an auto-transformer 16. The two windings have a common point connected to the collector electrode 7, and one winding is connected through a resistor 17 to the negative terminal of the source 9, and the other winding is connected through a resistor 18 to the base electrode 4 of the crystal triode 2. The collector electrode 8 is connected through an output load 19 to the negative terminal of the source 9. The output load may be a telephone receiver, for example.

The resistors 11 and 13 are provided to supply a suitable small fixed negative bias potential to the emitter electrode 5. Likewise the emitter electrode 6 has a small negative bias potential determined by the resistor 12. Suitable negative bias potentials for the collector electrode 7 and base electrode 4 are provided by the resistors 17 and 18. The bias resistors 11, 12, 17 and 18 are shown shunted by by-pass capacitors 20, 21, 22 and 23 respectively. Appropriate bias for the collector electrode 8 may be obtained by suitably choosing the resistance of the load device 19.

According to the invention, direct current negative feedback is provided by a connection between the emitter electrode 6 of the output crystal triode 2 and the base electrode 3 of the input crystal triode 1 through a resistor 24. This resistor is connected to the junction point of the by-pass capacitor 15 and the secondary winding of the input transformer 14.

In this circuit the bias resistors should be chosen so that the base potential of each crystal triode is only slightly below that of the emitter electrode, and so that the collector potential is considerably lower than the base potential. With this choice, the base current is small compared with the emitter and collector current, which will therefore be practically equal. Thus it will be seen that if the collector current of the crystal triode 2 should tend to increase, the emitter current will also tend to increase, and this will reduce the potential of the base electrode 3 on account of the increased potential drop in the resistor 12. The potential difference between the emitter and base electrodes 5 and 3 will accordingly be increased, and this will in turn increase the collector current of crystal triode 1. The corresponding increased potential drop in resistor 17 will raise the potential of the base electrode 4, thus reducing the difference of potential between the emitter and base electrodes 6 and 4, and so reducing the collector current of the crystal triode 2. The reverse action takes place if the collector current of the crystal triode 2 tends to decrease. Thus the connection through the resistor 24 applies negative feedback for direct current and stabilises the collector current of the crystal triode 2. It will be appreciated that the collector current of the crystal triode 1 will also be stabilised by this arrangement.

It should be mentioned that by making use of the auto-transformer 16 for coupling the two crystal triodes, a direct current connection is also obtained by means of which proper biassing of the collector electrode 7 and base electrode 4 is carried out with the minimum number of circuit elements. Since a step-down transformation is usually required between the collector electrode 7 and the base electrode 4, it is necessary that the two windings of the auto-transformer be wound in opposite directions, so that a current flowing through both windings in series produces opposing fluxes in the core. If $N_1$ and $N_2$ are the numbers of terms of the upper and lower windings, then the voltage transformation ratio is $N_1/(N_1-N_2)$, and $N_1$ and $N_2$ can evidently be chosen to give the desired step-down ratio.

It should be pointed out that the auto-transformer 16 could be differently arranged. For example, the resistor 18 could be connected to a tap on the upper winding between the resistor 17 and the collector electrode 7, the lower winding being omitted. In this case, of course, the two effective windings will be wound in the same direction, and the transformation ratio will be $(N_1+N_2)/N_1$ where $N_1$ and $N_2$ are the numbers of turns of the portions of the winding connected respectively to the resistor 17 and to the electrode 7. While this arrangement may be suitable in some cases, it provides a less efficient direct current coupling between the two stages than that shown in Fig. 1.

The circuit of Fig. 1 contains all the elements which may be needed to meet a wide range of requirements for the amplifier. In many cases the circuit can be considerably simplified by omitting some of the elements. Thus, the value of the resistor 12 can often be chosen so that the necessary amount of negative feedback is obtained with the value of the resistor 24 reduced to zero, in which case it is not required. Then the capacitor 21 is not required either. The resistor 12 is then likely to be rather small, so that the negative bias applied to the base electrode 3 is suitable to allow the emitter electrode 5 to be connected directly to conductor 10. Then elements 11, 13 and 20 are not required, and can be omitted. Furthermore, resistor 17 will usually be not very large, and accordingly if the upper winding of the auto-transformer 16 be wound to a suitable resistance the resistor 17 will not be required and so the capacitor 22 can be omitted.

Figure 2:
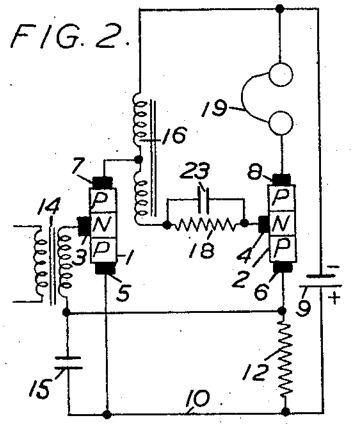

The circuit so simplified then appears as shown in Fig. 2, in which those elements which are the same as in Fig. 1 have been given the same designation numbers.

In a particular example of Fig. 2, in which the potential of the source 9 was 1½ volts and in which the collector current of the crystal triode 2 was 2 milliamperes, resistor 12 was 80 ohms and resistor 18 was 8,200 ohms. It was found that the variations of the collector current of crystal triode 2 did not exceed ±20 percent for different samples of the crystal triodes and over a temperature range of 40° C. The increase in power consumption required to obtain this degree of stabilisation was only 10 percent.

It will be evident to those skilled in the art that the lower winding of the auto-transformer 16 could in principle be wound to a sufficiently high resistance to enable the resistor 18 to be dispensed with, together with the capacitor 23, but this may not often be practicable since resistor 18 is generally likely to be very large.

It has already been stated above that a step-down transformation between the two crystal triodes will usually be required. However if no transformation is necessary, the transformer 16 may be omitted, and in that case (referring to Fig. 1) the left hand terminal of the resistor 18 should be connected directly to the collector electrode 7 and to the lower end of resistor 17, and the capacitor 22 should be omitted. As already explained, elements 11, 13, 20, 21 and 24 of Fig. 1 may also be omitted.

Figure 3:
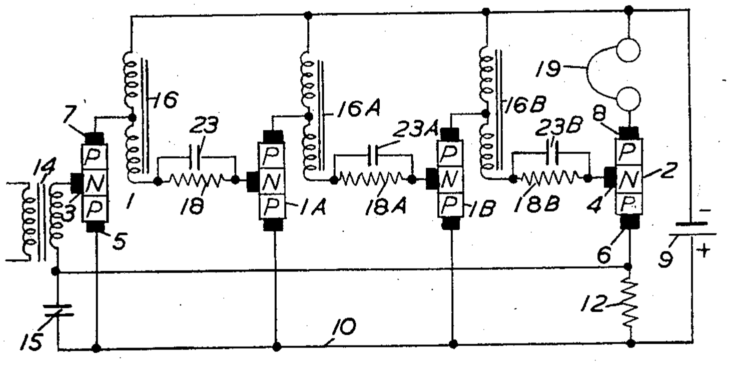

The arrangements illustrated in Fig. 1 or 2 can be extended to an amplifier with any even number of stages by interposing between the crystal triodes 1 and 2 an even number of additional crystal triode stages coupled together with auto-transformers. An example of a four stage amplifier is shown in Fig. 3, the simplified arrangement of Fig. 2 being used. It will be seen that the two extra crystal triodes 1A and 1B with the associated elements 16A, 18A, 23A and 16B, 18B, 23B are arranged in just the same way as crystal triode 1 and its associated elements 16, 18 and 23.

Figure 4:
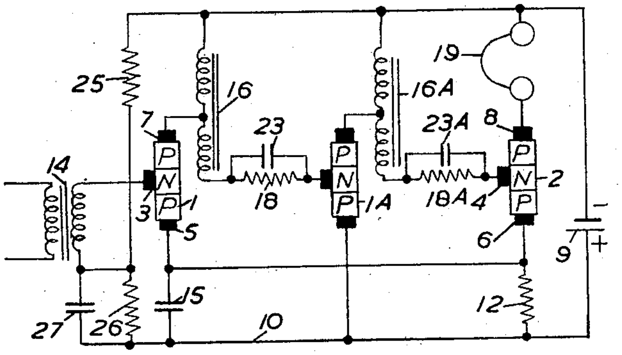

If the amplifier has an odd number of stages, then the direct current feedback circuit is connected to the emitter electrode of the first stage instead of to the base electrode, on account of the phase reversal which takes place at each amplifying stage. The arrangement is shown in Fig. 4 for a three stage amplifier. In this case because the emitter electrode 5 is biassed negatively by the potential drop through resistor 12, two resistors 25, 26 connected in series across the source 9 must be provided for biassing the base electrode 3 slightly more negatively than the emitter electrode 5. Resistor 26 should preferably be shunted by a by-pass capacitor 27. The intermediate crystal triode 1A and its associated elements are arranged as in Fig. 3.

Figure 5:
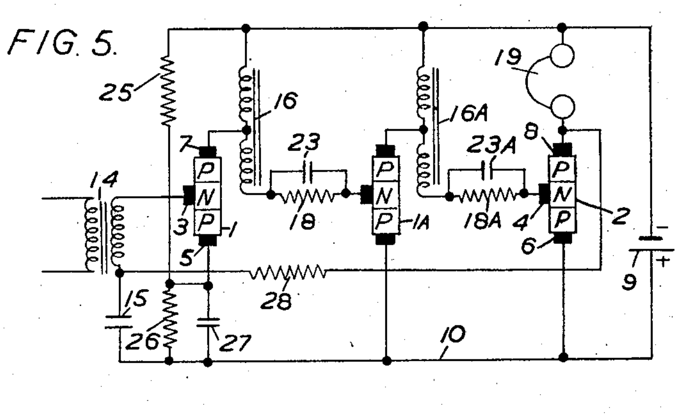

If desired, the direct current negative feedback connection may be taken from the collector electrode 8 of crystal triode 2 instead of from the emitter electrode 6, as shown in Fig. 5 for a three stage amplifier. Since the emitter and collector voltages are in opposite phase, it is necessary to connect the feedback path to the base electrode 3 of crystal triode 1 instead of to the emitter electrode, as in Fig. 4. The connection is made through a resistor 28, and since thereby an excessive negative bias may be applied to the base electrode 3, the elements 25, 26 and 27 are in this case used to bias the emitter electrode 5 appropriately so that it will be only slightly positive to the base electrode.

Figure 6:
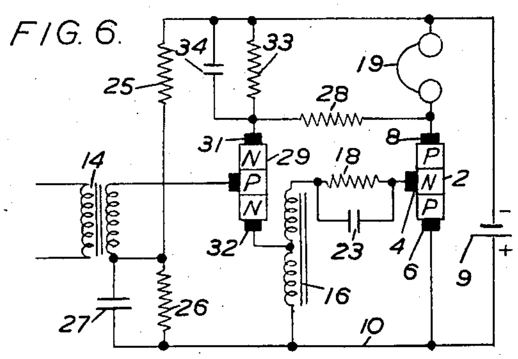

Fig. 6 shows a two stage amplifier in which the crystal triode 29 in the first stage is of the N–P–N-type, while the crystal triode 2 in the second stage is of the P–N–P-type, as before. The base electrode 30 of the crystal triode 29 is in contact with the P-type region of the crystal, and the emitter and collector electrodes 31 and 32 are in contact with the N-type regions. In this case the crystal triode 29 has to be polarised oppositely to the crystal triode 2, and so the emitter electrode 31 is connected to the negative terminal of the source 9 through a resistor 33, and the collector electrode 32 is connected through the auto-transformer 16 to the conductor 10. A by-pass capacitor 34 shunts the resistor 33, and the feedback resistor 28 is connected between the collector electrode 8 and the emitter electrode 31.

It is necessary to provide the elements 25 to 27 for polarising the base electrode 30 so that it shall be negative to the collector electrode 32 and slightly positive to the emitter electrode 31.

It will be evident to those skilled in the art that a P–N–P type crystal triode could have been used instead of the crystal triode 29, and if so, the feedback connection would still be to the emitter electrode. With any even number of stages, the output of the feedback connection will always be to the emitter electrode of the first stage if the input is taken from the collector electrode of the crystal triode in the last stage.

It will also be clear that any of the crystal triodes of the P–N–P type shown in Figs. 1 to 5 could be replaced by a crystal triode of the N–P–N type provided that the connections to the source 9 are inverted, as indicated in Fig. 6 for the crystal triode 29.

If all the crystal triodes shown in any one of Figs. 1 to 5 are of the N–P–N type, the only modification required is to reverse the source 9.

Figure 7:
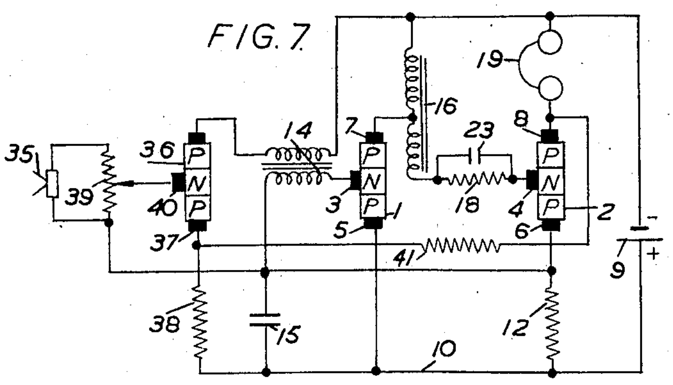

Fig. 7 shows an example of a complete hearing aid device comprising a two-stage amplifier arranged substantially as shown in Fig. 2 with direct current negative feedback between the emitter electrode 6 of the crystal triode 2, and the base electrode 3 of the crystal triode 1. A microphone 35 is connected to the input transformer 14 through a coupling amplifier comprising a crystal triode 36 of the P–N–P type, the emitter electrode 37 of which is connected to conductor 10 through a resistor 38. A potentiometer 39 is connected across the microphone 35, and the movable contact is connected to the base electrode 40 of the crystal triode 36. The lower end of the potentiometer 35 is connected to the emitter electrode 6 of the crystal triode 2.

In addition to the direct current negative feedback coupling between the crystal triodes 2 and 1, negative feedback for stabilising the gain of the amplifier at signal frequencies is provided by the resistor 41 which connects the collector electrode 8 of the crystal triode 2 to the emitter electrode 37 of the crystal triode 36. By suitable choice of the values of resistors 12 and 38 the emitter and base electrodes 37 and 40 of the crystal triode 36 may be biassed so that the base electrode is slightly negative to the emitter electrode.

The microphone 35 will preferably be of the electromagnetic type, and it will be noted that a variable proportion of the base current of the crystal triode 36 will flow through it, according to the adjustment of the potentiometer 39. The base current is usually very small and so this is not likely to be objectionable. However, if desired, a blocking capacitor (not shown) may be connected in series with the microphone 35.

It will be understood that a microphone (not shown) could be added to any of the amplifiers described with reference to Figs. 1 to 6 in order to provide a hearing aid; and also a further negative feedback path (not shown) effective for alternating current could be added to the circuit of any of these figures, whether used in a hearing aid, or not, for stabilising the gain of the amplifier.

While the principles of the invention have been described above in connection with specific embodiments, and particular modifications thereof, it is to be clearly understood that this description is made only by way of example and not as a limitation on the scope of the invention.

What we claim is:

1. An alternating current amplifier comprising a plurality of transistor amplifier stages, each stage having an input and an output circuit, a plurality of coupling means for coupling said stages in cascade, at least one of said coupling means comprising both a direct current coupling means and an alternating current coupling means, said last named means including a voltage transformation means for substantially matching the output impedance of one of said stages to the input impedance of the next succeeding stage, and a direct current negative feedback path connected between said next succeeding stage and an earlier stage of said plurality of stages, whereby the collector current in said next succeeding stage is stabilized.

2. An amplifier according to claim 1 in which said voltage transformation means comprises a transformer having two windings and a direct current connection between said two windings whereby said windings are connected in series.

3. An amplifier according to claim 2 in which the two windings of said two-winding transformer are so wound that the direction of the flux due to alternating current flowing in one of said windings is opposed to the direction of the flux due to alternating current flowing in the other of said windings, and in which said direct current coupling means comprises means for connecting the output circuit of said one of said stages to said direct current connection between said windings and means connecting the input circuit of said next succeeding stage across said series connected windings.

References Cited in the file of this patent

UNITED STATES PATENTS

| | | |
|---|---|---|
| 2,613,282 | Scaife | Oct. 7, 1952 |
| 2,729,708 | Goodrich | Jan. 3, 1956 |
| 2,762,875 | Fischer | Sept. 11, 1956 |

OTHER REFERENCES

"Radio Engineer's Handbook," Terman, 1943, pages 164–170. (Copy is available in P.O. Library.)

"Transistor Circuits," Shea, 1953, pages 164 and 351. (Copy available in Div. 69.)